May 31, 1932.  C. L. KNUTSON  1,860,861
SNAP FASTENER SECURED CONDUIT HOLDING MEMBER
Filed Sept. 14, 1931
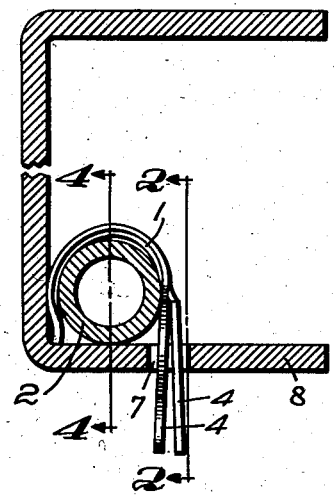
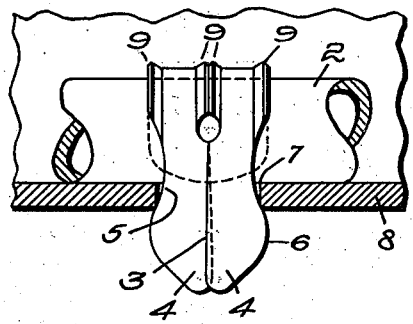
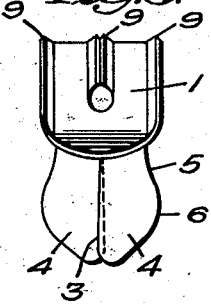
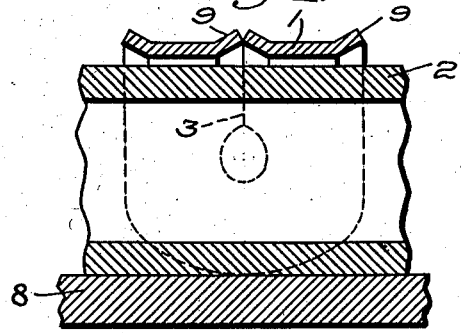
Inventor:
Carl L. Knutson
by Emery, Booth, Varney & Townsend
Attys Patented May 31, 1932

1,860,861

UNITED STATES PATENT OFFICE

CARL L. KNUTSON, OF MAYWOOD, ILLINOIS, ASSIGNOR TO UNITED-CARR FASTENER CORPORATION, OF CAMBRIDGE, MASSACHUSETTS, A CORPORATION OF MASSACHUSETTS

SNAP FASTENER SECURED CONDUIT-HOLDING MEMBER

Application filed September 14, 1931. Serial No. 562,625.

My invention aims to provide improvements in snap fastener secured conduit-holding members.

In the drawings which illustrate a preferred embodiment of my invention:—

Figure 1 is a section through an installation showing one embodiment of my invention and the use thereof;

Fig. 2 is a section taken on the line 2—2 of Fig. 1;

Fig. 3 is an elevation view of the conduit-holding member shown in Figs. 1 and 2; and Fig. 4 is an enlarged section taken on the line 4—4 of Fig. 1.

Referring to the particular embodiment of my invention illustrated by the drawings, I have shown a device preferably formed from yieldable sheet metal and adapted to be quickly and easily installed to hold in place various types of conduits such as gasoline pipes, air pipes, electric wires, etc. One of the many uses of my improved device is in connection with motor vehicle structures where it is used to hold in position along the chassis or other places the gasoline pipes and other conduits, as shown in Fig. 1.

In the particular embodiment of my invention illustrated, I have shown a conduit-holding member formed from a single piece of sheet metal and being substantially inverted J-shaped in side elevation. The device is preferably made by stamping the desired form from a strip of metal and bending it to form a loop 1 which is curved in side elevation to provide substantially U-shaped means for engaging over one or more conduits 2, as best shown in Figs. 1 and 2. One side of the U-shaped portion is extended to the loop portion 1 to provide socket-engaging means divided by a slit 3 to provide portions 4—4 yieldable toward and away from each other. These portions 4—4 (Fig. 2) have edges which are shaped to diverge from each other, beginning at a point adjacent to where they connect the loop portion 1, thereby to provide a neck 5, and then converge, thereby providing a bulbous portion or head 6 which may readily enter and snap through the aperture 7 in the supporting structure 8, as best shown in Figs. 1 and 2. It will be understood by those skilled in the art that the converging portions readily adapt themselves to apertures 7 of different widths and also adapt the device for holding conduits of different diameters tightly against the frame structure 8, because of their ability to expand and draw the loop portion 1 toward the frame structure 6.

The slit 3 extends a substantial distance into the U-shaped conduit engaging portion 1 (Figs. 3 and 4), thereby providing maximum resiliency to the yieldable portions 4—4. Furthermore the portions 4—4 are bent into planes for overlapping relation, thereby to have a scissors-like action during contraction and expansion.

My device is decidedly simple and, since it is made from sheet metal of substantial width, it affords a wide bearing against the conduit and is very durable. I have found that the edges 9 of the U-shaped portion both at the periphery and at the slit 3 may be flared upwardly (Fig. 4), thereby to prevent cutting into the conduit.

The device which I have illustrated and described is simple in construction, relatively inexpensive to manufacture, and decidedly advantageous both to the manufacturer using such devices and to the repair man when it is necessary to remove or repair a conduit, or conduits, held in place by my improved device.

While I have illustrated and described a preferred embodiment of my invention, I do not wish to be limited thereby, because the scope of my invention is best defined by the following claims.

I claim:

1. A sheet metal snap fastener device for holding conduits comprising a substantially U-shaped conduit-engaging portion and yieldable socket-engaging means formed as a continuation of one side of said conduit-engaging portion for securing the device to a member to which the conduit is to be clamped.

2. A snap fastener device of the class described formed from sheet metal and having a looped conduit-engaging portion bent to span a conduit and socket-engaging means extending from one side of the looped portion and forming a continuation thereof, said socket engaging means being in the form of a pair of yieldable fingers adapted to move toward and away from each other and each having an edge shaped to cooperate and provide a stud head and neck.

3. A snap fastener device of the class described formed from a single piece of sheet metal which is inverted J-shaped in one elevation thereof, conduit-engaging means provided by the curved portion thereof and socket-engaging means provided by the straight portion thereof forming a continuation at one side of the curved portion, said socket-engaging means having a slit formed therein to provide a pair of yieldable portions and said slit extending into said curved portion to provide increased resiliency to said yieldable portions.

4. A sheet metal snap fastener device for holding conduits comprising a substantially U-shaped conduit-engaging portion and yieldable socket-engaging means formed as a continuation of one side of said conduit-engaging portion for securing the device to a member to which the pipe is to be clamped and said U-shaped portion having upwardly flared edges to prevent cutting of the conduit.

5. A snap fastener device of the class described formed from a single piece of sheet metal which is inverted J-shaped in one elevation thereof, conduit-engaging means provided by the curved portion thereof and socket-engaging means provided by the straight portion thereof forming a continuation at one side of the curved portion, said socket-engaging means having a slit formed therein to provide a pair of yieldable portions and said slit extending into said curved portion to provide increased resiliency to said yieldable portions, said conduit-engaging means having upwardly flared edges at its periphery and at the slit to prevent cutting of the conduit.

In testimony whereof, I have signed my name to this specification.

CARL L. KNUTSON.